United States Patent [19]
Ethington

[11] 4,219,534
[45] * Aug. 26, 1980

[54] METHOD FOR REMOVING NITROGEN OXIDES FROM A GAS STREAM

[75] Inventor: Donald Ethington, Dimmitt, Tex.

[73] Assignee: Goodpasture, Inc., Brownfield, Tex.

[*] Notice: The portion of the term of this patent subsequent to Apr. 24, 1996, has been disclaimed.

[21] Appl. No.: 21,167

[22] Filed: Mar. 15, 1979

Related U.S. Application Data

[63] Continuation-in-part of Ser. No. 638,043, Dec. 5, 1975, Pat. No. 4,151,265, which is a continuation-in-part of Ser. No. 533,196, Dec. 16, 1974, abandoned, which is a continuation-in-part of Ser. No. 455,568, Mar. 28, 1974, abandoned.

[51] Int. Cl.$^2$ .............................................. C01C 1/18
[52] U.S. Cl. ................................... 423/235; 423/396
[58] Field of Search .............................. 423/235, 396

[56] References Cited

U.S. PATENT DOCUMENTS

| | | | |
|---|---|---|---|
| 2,102,136 | 12/1937 | Shapleigh | 423/396 |
| 3,453,071 | 7/1969 | Schmitt | 423/235 |
| 4,151,265 | 4/1979 | Ethington | 423/235 X |

FOREIGN PATENT DOCUMENTS

| | | | |
|---|---|---|---|
| 892587 | 8/1953 | Fed. Rep. of Germany | 423/385 |
| 778244 | 7/1957 | United Kingdom | 423/396 |
| 1002939 | 9/1965 | United Kingdom | 423/396 |

*Primary Examiner*—G. O. Peters
*Attorney, Agent, or Firm*—Arnold, White & Durkee

[57] ABSTRACT

A gas stream containing nitrogen oxides, such as the tail gas from a nitric acid plant, is treated to reduce the nitrogen oxides content thereof. The method results in the production of an aqueous solution of ammonium nitrate. In a liquid-gas contact apparatus, the gas stream is first reacted, under steady state conditions, in counter-current flow, with an aqueous solution of ammonium nitrate at a pH of about 0.01 to about 0.5. The gas stream is then further reacted with an aqueous solution of ammonium nitrate at a pH of about 8.1 to about 8.5; and thereafter with water, preferably slightly acidified to a pH of 6.0 to 6.5. The resulting gas stream of reduced nitrogen oxides content may be safely discharged to the atmosphere without causing air pollution, the nitrogen oxides content being below imposed standards.

14 Claims, 1 Drawing Figure

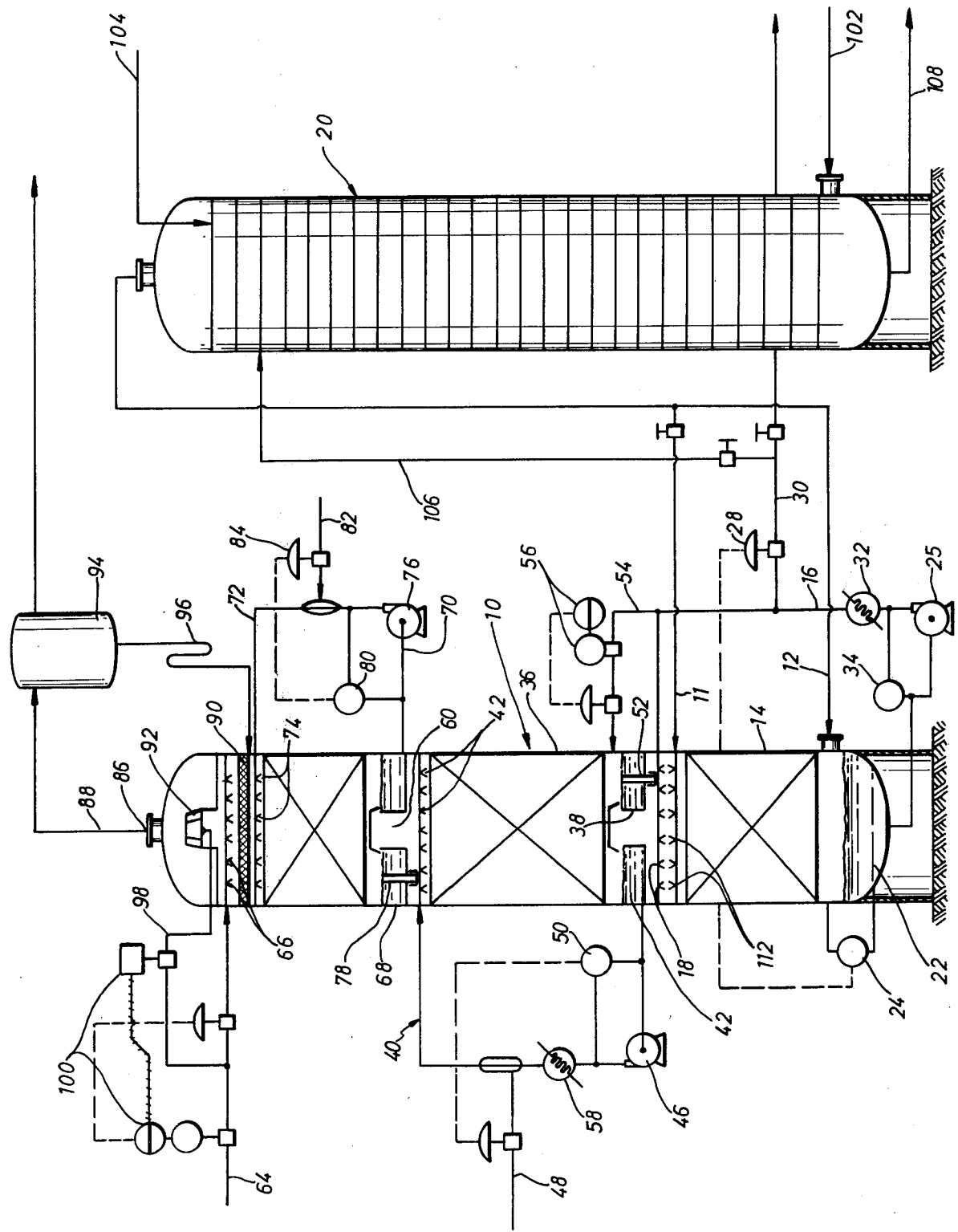

METHOD FOR REMOVING NITROGEN OXIDES FROM A GAS STREAM

REFERENCE TO RELATED APPLICATION

This application is a continuation-in-part of application Ser. No. 638,043 filed Dec. 5, 1975, now U.S. Pat. No. 4,151,265 which application is a continuation-in-part of application Ser. No. 533,196 filed Dec. 16, 1974 now abandoned, which application is a continuation-in-part of application Ser. No. 455,568, filed Mar. 28, 1974, now abandoned.

BACKGROUND OF THE INVENTION

1. Field of the Invention

This invention relates to the treatment of gas streams containing nitrogen oxides; more particularly the present invention relates to a method for the treatment of such gas streams containing nitrogen oxides, particularly the tail gas from a nitric acid plant, in order to reduce or substantially eliminate the nitrogen oxides content of a gas stream while producing an aqueous ammonium nitrate solution product.

2. Description of the Prior Art

Various industrial processes, such as the production of nitric acid and the nitration of organic compounds, produce waste gas streams containing small proportions of nitrogen oxides, principally as nitric oxide and nitrogen dioxide. Discharge of such waste gas streams into the atmosphere is highly objectionable, since the nitrogen oxides are toxic, corrosive, and act as atmosphere pollutants. Because of the pollution to the atmosphere which is caused by discharge of waste gas streams containing nitrogen oxides, limits upon the nitrogen oxides content which can be present in any industrial waste gas are set by the Environmental Protection Agency. While the allowable limits, of course, differ depending upon location and other factors, such as prevailing winds, etc., it is generally necessary to treat the industrial gas streams so that the nitrogen oxides content is at least below 200 parts per million. As a result, such waste gas streams must be treated in order to eliminate nitrogen oxides prior to discharge of the waste gas stream into the atmosphere. One typical approach is to catalytically react the waste gas stream contaning nitrogen oxides with a reducing gas such as methane or hydrogen. Methane, or natural gas principally consisting of methane, is generally employed, due to economic considerations. The catalyst generally employed is an expensive platinum group metal such as platinum, palladium, rhodium, ruthenium, osmium or iridium, or a mixture of such metals. The catalyst may be in the form of unsupported wire mesh; however, the catalyst is generally supported on a suitable carrier such as alumina pellets, nichrome wire or silica gel. The catalytic reaction of the nitrogen oxides with the reducing gas results in the elimination of the nitrogen oxides, with the formation of free nitrogen and water vapor and/or carbon dioxide. When free oxygen is also present in the waste gas stream, as in the case of a tail gas from a nitric acid process, the free oxygen preferentially reacts with the reducing gas before reaction of the nitrogen oxides can take place. This results in a wasteful consumption of the reducing gas. A final waste gas stream substantially free of nitrogen oxides and suitable for discharge into the atmosphere is produced; however, the process is costly and wastes energy in the combustion process.

In addition to such catalytic reaction or catalytic combustion of the nitrogen oxides present in the industrial gas stream, a further typically employed method is to pass the nitrogen oxides containing industrial waste gas over a molecular sieve. While this method is effective to reduce the nitrogen oxides content, the successful adoption of this technique has been somewhat thwarted by the expensive nature of the technique, including the high operation costs when employing a molecular sieve. This is due to the fact that the molecular seive is quickly poisoned by contaminants within the industrial waste gas stream, making regeneration of a molecular sieve a frequent occurrence. The use of the molecular sieve to reduce the nitrogen oxides content is also disadvantageous in that there are great power requirements, thereby increasing the economic disadvantages of the procedure.

In addition to the above methods which have been proposed for the removal of nitrogen oxides from an industrial waste gas stream, various chemical methods have also been proposed. These are exemplified by the urea destrvction method and a method which employs an ammonium nitrate scrubbing solution. The use of urea to remove the nitrogen oxides is exemplified by a method set forth for example in U.S. Pat. No. 3,565,575 in which a gas stream containing nitrogen oxides, such as a tail gas from a nitric acid plant, is scrubbed with an aqueous urea solution. The nitric acid reacts with the urea to form nitrogen, carbon dioxide and water. Due to the destruction of the urea in this reaction, the use of urea to remove the nitrogen oxides from an industrial waste gas stream is quite costly. As a result, this method has not been successfully practiced commercially. In addition, the removal which can be achieved by utilizing urea in this manner is not totally satisfactory.

The use of a scrubbing solution of ammonium nitrate is exemplified by U.S. Pat. No. 3,453,071. This method involves the introduction of the gas stream into an ammoniacal solution of ammonium nitrate, generally at a temperature of about 20° to 30° C. and an ammonium nitrate content greater than 30% by weight. An eight stage process is exemplified and applicability of a weakly acidic ammonium nitrate solution is described. A great disadvantage of this method is that to be effective, the molar ratio of NO to $NO_2$ must be adjusted to 1:1 prior to introduction of the gas into the ammoniacal solution of ammonium nitrate. This complicates the process and makes the same economically disadvantageous. This, coupled with the fact that the removal of nitrogen oxides is apparently somewhat less than satisfactory, has lead to the conclusion that this process cannot be conducted satisfactorily on a commercial scale, absent disadvantages which cannot be removed.

An improved method and apparatus for the removal of nitrogen oxides from a gas screen, principally the tail gas from a nitric acid plant is described in applicant's copending application Ser. No. 638,043 filed Dec. 5, 1975. That co-pending application describes the removal of nitrogen oxides by sequentially contacting the nitrogen oxides-containing gas stream in gas-liquid contact apparatus with reaction liquids comprising, first an aqueous acid solution of ammonium nitrate, secondly an aqueous ammoniacal solution of ammonium nitrate and finally water, preferably slightly acidified. The apparatus which is described in connection with such method allows for co-current contact of the gas stream containing nitrogen oxides and each reaction liquid in a separate stage of the contact apparatus. At the exit of each stage, a device is provided to separate the gas from the reaction liquid so that the gas stream can be sent on for further contact or exit of the gas-liquid contact apparatus. Such device is described as preferably being a cyclone separator.

In addition, to effect an elimination of particulate matter which may be present in the gas stream, applicant's co-pending application suggests the inclusion of a venturi type orifice between the ammoniacal ammonium nitrate stage and water stage in the gas-liquid contact apparatus.

While the method and apparatus described in that copending application are extremely effective in the removal of nitrogen oxides from a gas stream to well below all current environmental standards, it has now been found that certain improvements in the $NO_x$ removal can be achieved in accordance with the present invention. For example, it has been discovered in accordance with the present invention that by operating with counter-current flow of the gas stream and reaction liquids in each stage, the need for a cyclone separator to separate gas and liquid can be eliminated. Furthermore, it has been determined that the venturi device is not necessary and simpler means for eliminating entrained particulate matter can be utilized with this counter-current flow scheme. Accordingly, the capital investment necessary to effect the $NO_x$ removal can be reduced.

In addition, it has been determined that the method described in applicant's co-pending application, specifically as it relates to co-current flow of reaction liquids and gas stream is most effective for $NO_x$ removal under high pressure conditions, i.e., pressures of 7 to 8 atmospheres in the nitric acid absorber. While such a system has applicability in low pressure environments, i.e., pressures of about 3 atmospheres in the nitric acid absorber or even atmospheric plants, it has been discovered in accordance with the present invention that the counter-current flow herein described has increased efficiency at low pressures when compared with the co-current flow of applicant's co-pending application. Accordingly, this provides a further advantage of the method described herein for the removal of $NO_x$ from a gas stream, particularly the tail gas of a nitric acid plant.

SUMMARY OF THE INVENTION

In accordance with this invention the foregoing has been achieved through the present method for treating a gas stream containing nitrogen oxides, such as from a nitric acid plant, power plant, or other industrial source, particularly a tail gas from a nitric acid plant. The method of the present invention produces a product gas stream of reduced nitrogen oxides content and an aqueous ammonium nitrate solution product. In accordance with the present invention, the nitrogen oxides removal and aqueous ammonium nitrate production are achieved by first contacting a gas stream containing nitrogen oxides, under steady state conditions, counter-currently, with a reaction liquid comprising an acidic aqueous ammonium nitrate solution, specifically an aqueous ammonium nitrate solution at a pH of about 0.1 to 0.5, preferably a pH less than about 0.3. The temperature of this reaction liquid is maintained below about 90° F., by cooling water and internal recycling. Under these conditions of pH and temperature, the formation of stable ammonium nitrite is suppressed and any nitrite formed is easily converted to the desired ammonium nitrate. The gas stream is thereafter contacted with an ammoniacal solution of ammonium nitrate of a pH of about 8.1 to about 8.5 and subsequently with water, preferably slightly acidified.

Preferably, the method of the present invention is carried out utilizing a sequence of steps, as follows:

(A) reacting a gas stream containing nitrogen oxides with an aqueous solution of ammonium nitrate at a pH of about 0.01 to 0.5 (acidic ammonium nitrate);

(B) thereafter reacting the gas stream with an aqueous solution of ammonium nitrate at a pH of about 8.1 to about 8.5 (ammoniacal ammonium nitrate); and (C) contacting the gas stream with water, preferably slightly acidified to a pH of about 6.0 to about 6.5.

The method of the present invention is specifically characterized by the fact that nitrogen oxides removal from the gas stream is accompanied by the formation of an aqueous solution of ammonium nitrate as a product. This greatly improves the economics of the process of the present invention when compared, for example, with typical processes involving the use of catalytic combustion or urea destruction, etc. In addition, the process of the present invention provides excellent efficiency in $NO_x$ removal, bringing the $NO_x$ content of the entering gas stream down to well below all presently imposed environmental standards.

A feature of the present invention resides in the fact that by operating under the specified conditions, the formation of ammonium nitrate is increased and any ammonium nitrite formed is in an unstable condition, readily reacted and/or oxidized to the desired ammonium nitrate. This is achieved by maintaining the acidic ammonium nitrate within the pH range of from about pH 0.01 to pH 0.5. Also, the temperature of this acidic ammonium nitrate is maintained below about 90° F.

In accordance with the present invention, the pH of this acidic ammonium nitrate is normally maintained within the proper range absent the need for free nitric acid introduction. For example, the pH of this acidic ammonium nitrate will be maintained within the specified range due to the reaction between the incoming gas stream containing $NO_x$ or regenerate $NO_2$ gas and the aqueous solution, forming free nitric acid.

Under certain circumstances, such as low pressure, low oxygen content and/or desired abatement under 100 ppm, it is preferred to introduce free nitric acid or $NO_2$ rich gas into the acidic ammonium nitrate to assist in maintaining the pH within the desired range.

In accordance with the preferred aspects of the present invention, the process is carried out with a continuous downstream flow of the reaction liquids in each of the several reaction zones, with a continuous downstream and upstream flow from one reaction zone to another, thereby maintaining the reaction liquids in constant flow. This also helps to maintain the temperature below the desirable upper limit of about 90° F.

For example, with respect to upstream flow, a controlled portion of the acidic ammonium nitrate can be continuously passed into the ammoniacal ammonium nitrate to effectively control the reaction and maintian appropriate pH levels. In connection with the ammoniacal ammonium nitrate a reaction tends to occur at the point of introduction of the acidic ammonium nitrate, forming additional ammonium nitrate and $NO_2$ gas. This also tends to lower the pH and reduce the amount of ammonium nitrite recycled.

In terms of the downstream flow of the various reaction liquids, in accordance with the preferred embodiment of the present invention, a portion of the water stream is withdrawn and introduced into the ammoniacal ammonium nitrate. In turn, a portion of the ammoniacal ammonium nitrate is withdrawn and introduced into the acidic ammonium nitrate. This has the effect of converting any $NH_3$ or ammonium nitrate liquified in the third stage and any ammonium nitrite formed in the second stage into the desired ammonium nitrate product. Again, it should be recognized that the conditions present in the acidic ammonium nitrate favor the production of ammonium nitrate and any ammonium nitrite formed is in an unstable condition, readily reacted and/or oxidized to ammonium nitrate, or converted to $NO_2$ gas to be absorbed as acid and neutralized with ammonia.

In addition to this recycling and transfer of reaction liquids between the various stages and zones, internal recycling within each reaction stage is also carried out in the preferred embodiment of the present invention. An aqueous solution of ammonium nitrate is withdrawn from the recycling acidic ammonium nitrate as an absorber makeup or product of the method of the present invention.

Still further, in preferred embodiments of the present invention, the gas stream which exits the third stage or water stage of the gas-liquid contact apparatus passes through a mist separator and filtering elements in order to remove any sub-micron particles of ammonium nitrate which may be entrained in the gas stream. Preferably, the elements to achieve this sub-micron particle separation comprise a mist separator such as a York mesh ® mist separator and filtering elements such as Brinks HV ® filters. These elements can be mounted between the third stage or water stage of the gas-liquid contact apparatus and the exit of the gas stream from such apparatus.

The method of the present invention when compared with previously proposed prior art processes has the advantages of efficiency, low cost (including product production) and the ability to effectively reduce the nitrogen oxides content far below current standards. When compared, for example, with the urea process, the method of the present invention not only allows for a more effective reduction of the nitrogen oxides content but, in addition, does not involve costly consumption or destruction of urea. When compared with the previously proposed ammonium nitrate scrubbing process, the method of the present invention has the advantage of not requiring an initial adjustment of the molar ratio of NO to $NO_2$ and a greater efficiency in the reduction of nitrogen oxides content.

The method described herein has the further advantage when compared with that disclosed in applicant's co-pending application Ser. No. 638,043 of reduced capital cost and greater efficiency of operation, particularly in connection with $NO_x$ removal to a very low concentration, low $O_2$ concentration or low pressure nitric acid plants.

BRIEF DESCRIPTION OF THE DRAWING

In the drawing:
The FIGURE is a cross-sectional view of the gas-liquid contact apparatus for carrying out the process of the present invention.

DESCRIPTION OF THE PREFERRED EMBODIMENTS

The desirable features of the present invention described above and the advantages of the present invention previously described are achieved in accordance with the present invention by treating a gas stream containing nitrogen oxides, particularly a tail gas from a nitric acid plant, to produce a product gas stream of reduced nitrogen oxides content and a product comprising an aqueous solution of ammonium nitrate by a method which comprises:

(A) reacting a gas stream containing nitrogen oxides with an aqueous solution of ammonium nitrate at a pH of about 0.01 to about 0.5, preferably a pH of less than about 0.3;

(B) thereafter reaching the gas with an aqueous solution of ammonium nitrate at a pH of about 8.1 to about 8.5, preferably a pH of about 8.1 to about 8.3; and (C) reacting the gas with water, preferably at a pH of about 6.0 to about 6.5.

Again, it is often preferred to introduce free nitric acid or $NO_2$ rich gas into the acidic ammonium nitrate to assist in maintaining the pH.

The gas exiting the water zone or stage of step (C) has the required reduced nitrogen oxides content, the nitrogen oxides content being below environmental standards. In addition, a product comprising an aqueous solution of ammonium nitrate is formed in this method.

The method of the present invention is preferably carried out utilizing gas-liquid contact apparatus separated into three stages or zones, each stage being a packed contact zone allowing intimate contact of the gas stream containing nitrogen oxides and reaction liquid. While it is apparent that $NO_x$ removal is achieved in the present invention through a combination of absorption and reaction, the liquid media employed are referred to herein as reaction liquids since the principal removal is through chemical reaction. There is no intention, however, to downplay the removal by physical action which also takes place.

In the first stage of such gas-liquid contact apparatus, the gas stream containing nitrogen oxides is reacted with an aqueous solution of ammonium nitrate at a pH of about 0.01 to about 0.5. The pH in the first stage is preferably below about 0.3. In the second stage the gas stream is reacted with an aqueous solution of ammonium nitrate at a pH of about 8.0 to about 8.5. In the third and final stage the gas stream is reacted or scrubbed with water, preferably slightly acidified to a pH of about 6.0 to 6.5. In the preferred embodiment of the present invention a filtering element is present between the exit of this third stage and the atmosphere to eliminate any entrained liquids from the product gas stream of reduced $NO_x$ content.

The gas-liquid contact apparatus employed in accordance with the present invention is so arranged as to allow contact of the gas stream containing nitrogen oxides and reaction liquids counter-currently. Preferably, the gas stream containing $NO_x$ is passed up through each of the successive contact zones or stages through the packings with each reaction liquid flowing downwardly. This allows intimate contact of gas and liquid.

By treating the gas stream containing nitrogen oxides in this manner, it is possible in accordance with the present invention to reduce the nitrogen oxides content from its initial concentration of 2,500 to 6,000 ppm, typical of the tail gas of the nitric acid plant, down to 150 ppm or less.

Referring to the drawings, the figure illustrates a typical system for carrying out the method of the present invention, for example, application of the method of the present invention for the removal of nitrogen oxides from the tail gas of a nitric acid plant.

As illustrated, a process source, such as a nitric acid plant absorber 20, discharges a gas stream which is introduced into the bottom of gas-liquid contact apparatus 10 through line 12. Taking as an example the tail gas from a nitric acid plant, the gas stream introduced into gas-liquid contact apparatus 10 through line 12 will contain both NO and $NO_2$. As previously indicated, the method and apparatus of the present invention are effective in the reduction of these nitrogen oxides and the production of an ammonium nitrate product, regardless of the initial concentration and/or ratio of the NO to $NO_2$. Accordingly, no adjustment of this mole ratio or concentration is necessary. Typically a tail gas from a nitric acid plant will contain from 3,000 to 5,000 ppm $NO_x$ and will be at a temperature of 80° to 100° F.

In the embodiment illustrated, the gas stream introduced through line 12 is contacted in gas-liquid contact apparatus 10 in various stages with a counter-current flow of reaction liquid. In the following discussion relative to the various stages of gas-liquid contact apparatus 10, reference will be made to steady state conditions, and alternative procedures for start-up will be later discussed.

In the first contact stage 14 the gas stream is contacted counter-currently with a first liquid stream introduced through line 16 by means of shower heads 18. First stage 14 is preferably a packed contact zone allowing intimate contact between the gas stream and liquid. Any conventional packing means suitably employed in gas-liquid or liquid-liquid contact apparatus can be employed in accordance with the present invention. For example, some conventional packing shapes include Raschig rings, Beryl saddles, Intalox saddles, "Telleretts", Pall rings, etc. The packing material used in accordance with the present invention can be in the form of rings, saddles or other similar shape and can conventionally be constructed of such typical materials as metal, porcelain, clay, carbon and suitable plastics. Steel rings (304 Stainless) known as Hi-Pack ® are found to be particularly effective in allowing the intimate contact between the gas stream containing nitrogen oxides and reaction liquids.

While the size of the packing material employed in each of the stages of the gas-liquid contact apparatus 10 of the present invention is not particularly important, generally the packing material will range in size from about 1½ inch to about 2 inches. Furthermore, it is preferred in accordance with the present invention that the packing be random rather than in a stacked manner. This allows for the most effective contact between the gas stream containing nitrogen oxides and the various reaction liquids. Still further, while it is applicable in accordance with the present invention to employ the same packing material in each of the various stages within the gas-liquid contact apparatus 10, it is possible in accordance with the present invention to vary the type and size of the packing material in the various stages depending upon the nature of the contact desired and, particularly, based upon the concentration of nitrogen oxides remaining in the gas stream. The selection of any particular packing material in each of the stages in accordance with the present invention can be carried out utilizing known parameters so as to keep the pressure drop across each stage as low as possible.

Under steady state conditions, the reaction liquid brought into counter-current contact with the gas stream in first stage 14 will be an aqueous solution of ammonium nitrate having a free nitric acid content such that the pH of this first reaction liquid is within the range of pH 0.01 to pH 0.5. Preferably the pH of this first reaction liquid will be less than about pH 0.3.

Generally, the ammonium nitrate concentration in this acidic ammonium nitrate will be from about 25% to about 50% by weight, preferably 30-35%, by weight, ammonium nitrate. This concentration is somewhat variable and can be regulated depending upon the desired ammonium nitrate product. If the ammonium nitrate concentration in this acidic ammonium nitrate is too dilute, a product will be formed which may require evaporation prior to subsequent use. Generally, the free nitric acid content of this acidic ammonium nitrate is from about 10% to about 15% by weight. This provides the desired acidity for the acidic ammonium nitrate reaction liquid.

In this first stage 14, the $NO_x$ of the incoming gas reacts with the acidic ammonium nitrate generating free nitric acid and ammonium nitrate, together with some ammonium nitrite. The ammonium nitrite formed is minimized by the pH of the reaction medium and, under the conditions prevailing, the ammonium nitrite is highly unstable and readily oxidized or converted in a molecular nature as well as ionic reaction to ammonium nitrate. These reactions are encouraged in low temperature, low pH, and high oxygen agitation. Acccordingly, the presence of ammonium nitrite in the reaaction liquid of first stage 14 will be minimized.

The temperature within first stage 14 is preferably maintained below about 90° F., with cooler temperatures being preferred. Generally the initial gas feed to first stage 14 has a temperature within the range of about 80° to 100° F., with the temperature tending to rise due to the exothermic heat of reaction between the $NO_x$ and acidic ammonium nitrate. If the temperature in first stage 14 tends to rise above about 110° F. the ammonium nitrate conversion becomes unstable, thereby preventing effective ammonium nitrate production. To keep the temprature below about 90° F., it is generally not necessary in accordance with the present invention to provide an external cooling means, as the temperature conditions within first stage 14 are maintained through internal recycling. This internal recycling also maintains the acidity level within first stage 14. The pH of the acidic ammonium nitrate generally can be maintained within the ranges set forth above in this manner.

It is presumed that most, if not all of the following chemical reactions take place in first stage 14:

$2NO_2 + H_2O \rightarrow HNO_3 + HNO_2$ $HNO_2 + NO_2 \rightarrow HNO_3 + NO$ $NO + \frac{1}{2}O_2 \rightarrow NO_2$ $2HNO_2 \rightarrow H_2O + N_2O_3$ $N_2O_3 \rightarrow NO + NO_2$ $2HNO_2 \rightarrow H_2O + NO + NO_2$ $HNO_2 + HNO_3 \rightarrow 2NO_2 + H_2O$ $NH_4^+ + NO_2^- \rightarrow N_2 + 2H_2O$ $3NO_2 + H_2O \rightarrow 2HNO_3 + NO$ The reaction liquid within first stage 14 forms a pool 22 at the base of gas-liquid contact apparatus 10. The level in pool 22 is controlled through a typical level control device 24, which controls the operation of pump 25 to withdraw a portion of the first reaction liquid through line 26 to recycle it through first stage 14 by means of line 16 and shower heads 18. Level control device 24 also operates a valve 28 which allows product liquid to be withdrawn from first stage 14 through line 30. Typically, this product liquid comprises 30 to 40% by weight ammonium nitrate, 5–10% nitric acid and the remainder water. As will be discussed hereafter, make-up first reaction liquid is supplied to first stage 14 through flow from the other stages of gas-liquid contact apparatus 10.

As illustrated, line 16 may pass through a suitable heat exchanger 32 to assist in maintaining the temperature below about 90° F. in first stage 14. Also, a suitable pH monitor 34 can be present at the outlet of first stage 14 so as monitor the pH of the circulating first reaction liquid. This pH monitor 34 can be utilized to introduce nitric acid into first stage 14 from a source, not shown. It should be recognized, however, that except under certain conditions the pH of first stage 14 can be maintained within proper level solely by the recycle shown.

The gas stream exiting first stage 14 is introduced into second stage 36 through weir 38. This gas stream will include the $NO_x$ which is not removed by reaction in first stage 14 and nitric acid in a gaseous form, together with the inert gases of the tail gas. The $NO_x$ content, however, will be greatly reduced due to the absorption and reaction of the $NO_x$ in first stage 14. Generally, about 40% to about 75% of the $NO_x$ is removed in this first stage.

The gas passing through weir 38 into second stage 36 is contacted counter-currently in second stage 36 with a second reaction liquid introduced into second stage 36 through line 40 and shower heads 42. Again, second stage 36, like first stage 14 is preferably a packed gas-liquid contact zone with any of the conventional packing materials being applicable. Stainless steel rings have again been found to be a particularly advantageous packing material. Second stage 36 is preferably constructed to provide from two to three times the contact time between the incoming gas and reaction liquid than first stage 14. The additional contact time is required in second stage 36 since the more difficult portion of the $NO_x$ removal and conversion is carried out in this stage. Accordingly, the contact time between the gas and liquid in second stage 36 should be greater than that for first stage 14. This contact time can be varied by adjusting the length of the stage and/or the nature of the packings, etc. In general terms, all that is required is that the first stage be of such size that sufficient contact is achieved between the gas and liquid phases for adequate contact and reaction.

The second reaction liquid introduced into second stage 36 through line 40 is, like the first reaction liquid, an aqueous solution of ammonium nitrate. However, this second reaction liquid is an ammoniacal solution having a pH within the range of about 8.0 to about 8.5, preferably a pH of about 8.0 to about 8.3. This ammoniacal ammonium nitrate effectively reduces the $NO_x$ content to the gas stream from an incoming level of at least several hundred ppm from first stage 14 to an exit level of 150 ppm or below. Preferably, the temperature within second stage 36 is within the same range as the temperature within first stage 14.

As illustrated, the second reaction liquid in second stage 36 forms a pool 42 at the bottom of second stage 36. A portion of the liquid in pool 42 is withdrawn through stream 44 and recycled to second stage 36 through line 40 by means of pump 46. The pH of the ammoniacal ammonium nitrate solution in second stage 36 is controlled by the addition of ammonia to stream 40 from line 48 in response to pH measurements of line 44/40 taken by pH meter 50.

The concentration of ammonium nitrate in this ammoniacal ammonium nitrate is essentially the same as that described above for the acidic ammonium nitrate. Again, the ammonium nitrate concentration can vary within wide limits, although an ammonium nitrate concentration of from about 25% to about 50% by weight is generally maintained. The ammonium nitrate concentration in the ammoniacal ammonium nitrate is preferably about 30% to about 35% by weight.

The liquid level in pool 42 is controlled by means of downcomer 52, which also controls the flow of ammoniacal ammonium nitrate out of pool 42 to first stage 14. This flow of some of the ammoniacal ammonium nitrate into first stage 14 has the effect of converting any ammonium nitrite which may be formed in second stage 36 into ammonium nitrate in first stage 14, wherein the conditions are more favorble for ammonium nitrate production and conversion of unstable ammonium nitrite into ammonium nitrate. The amount of ammoniacal ammonium nitrate flowing from second stage 36 to first stage 14 is small compared to the total amount of acidic ammonium nitrate recycling through line 16, such that the pH within first stage 14 is not substantially affected and an acidic pH within the ranges described above can be maintained. Also, a reaction will tend to occur in first stage 14 between the ammonia in the ammoniacal ammonium nitrate solution and the free nitric acid of the acidic ammonium nitrate, forming additional ammonium nitrate.

As illustrated, a portion of pool 22 of first stage 14 is preferably withdrawn from line 16 through line 54 and introduced into pool 42 of second stage 36 by operation of suitable valving 56. This has the effect of introducing some of the acidic ammonium nitrate in pool 22 into the ammoniacal ammonium nitrate of pool 42. A reaction tends to occur in pool 42 at the point of introduction of the acidic ammonium nitrate through line 54. The heat of the reaction is dissipated into the gas stream and in cooling water maintaining the temperature within first stage 14 below about 90° F.

In accordance with the present invention, second stage 36 serves a two-fold purpose. In this second stage 36 there is both gas-to-liquid conversion and liquid-to-gas conversion. the reactions which take place tend to recycle $NO_2$, in a liquid state from second stage 36 to first stage 14 through downcomer 52. This return of the $NO_2$ from second stage 36 to first stage 14 has the effect of increasing the production of the desired ammonium nitrate since the conditions favoring ammonium nitrate i.e., low pH and low temperature are present in first stage 14. Again it is to be noted that the reactions favoring the production of ammonium nitrate are retarded at a pH over about 1.5 and/or temperature over about 110° F.

At the liquid interface between the reaction liquid in first stage 14 and that liquid returning to first stage 14 from second stage 36 through downcomer 52, the reaction occurs which favors ammonium nitrate production and $NO_x$ removal from the reaction system. Where very low $NO_x$ content is necessary and/or under low pressure or low oxygen conditions, it is often desirable to increase this reaction by the addition of rich $NO_2$ gas to the upper packed section of first stage 14. This can be achieved for example by introducing rich $NO_2$ gas through line 110 from the nitric acid absorber inlet to the top of first stage 14 by means of distributor 112. This will have the effect of increasing the $NO_2$ to $NO$ ratio to about 2:1 at the exit of first stage 14. This higher $NO_2$ content will increase the total scope of the reactions which occur making normal control of pH and ammonium nitrate concentrations practical.

The reactions which occur in second stage 36 can be generally represented as follows:

$$2HO_2 + H_2O \rightarrow HNO_3 + HNO_2 \qquad (1)$$

$$NH_3 + HNO_3 \rightarrow NH_4NO_3$$

$$\underline{2NH_3 + HNO_3 + HNO_2 \rightarrow NH_4NO_3 + NH_4NO_2} \qquad (2)$$

$$2NH_4NO_3 \rightarrow 2NH_4NO_2 + O_2$$

$$2NO_2 + 2NH_3 + H_2O \rightarrow NH_3NO_2 + NH_4NO_2 \qquad (3)$$

$$NH_4NO_3 + 4HNO_3 + NO_2 + NO + O_2 \rightarrow 2NH_4NO_3 + 4NO + 5O_2 \qquad (4)$$

$$HNO_2 + HNO_3 \rightarrow 2NO_2 + H_2O \qquad (5)$$

$$NH_4^+ + NO_2^- \rightarrow N_2 + 2H_2O \qquad (6)$$

$$3NO_2 + H_2O \rightarrow 2HNO_3 + NO \qquad (7)$$

Where required to maintain the temperature within second stage 36 within desirable limits the second stage reaction liquid recirculating through line 44/40 by means of pump 45 can pass through a suitable heat exchanger 58, of any conventional design.

Again, the gas phase leaving second stage 36 has a substantially reduced nitrogen oxides content, generally in the range of 150 ppm or lower. This gas is passed through weir 60 into third stage 62.

This third stage 62 can be smaller than the second stage 36 and is a packed gas-liquid contact zone employing any of the previously described packing materials. Again, stainless steel rings have been found to be particularly advantageous in each of these packed stages.

The water which is utilized as the third reaction liquid or scrubbing liquid in third stage 62 is introduced into third stage 62 by means of line 72 and shower heads 74. This third reaction liquid is again passed in countercurrent flow with the gas stream entering third stage 62 through weir 60, forming a pool of water 68 at the base of third stage 62.

A portion of the liquid in pool 68 is withdrawn through line 70 and recycled to third stage 62 through line 72 and shower heads 74 by means of water pump 76.

A portion of the water is passed from pool 68 through downcomer 78 to second stage 36. This has the effect of providing a continuous downward flow of the reaction liquids, eventually reaching first stage 14, wherein the conditions are such that any nitrite present tends to be in an unstable form, thereby decreasing the formation of nitrites and increasing ammonium nitrate production.

Due to the withdrawal of ammonium nitrate product from line 16 through line 30, it is necessary to provide a continuous feed of water to third stage 62. This is achieved by introducing water (from a source not shown) through line 64 by means of shower heads 66 into third stage 62. As described, due to the recycling which occurs, this water introduced into third stage 62 has the effect of replenishing the reaction liquid to account for the ammonium nitrate product withdrawn from line 16 through line 30.

In the embodiment illustrated, the water introduced into third stage 62 from line 64 through shower head 66 is introduced directly above a mist separator 90. In accordance with a preferred embodiment of the present invention, mist separator 90 is a York mesh ® mist separator. Located above shower heads 66, in the path of the exiting gas stream, are filtering elements 92. Preferably, these filtering elements are Brinks HV ® filtering elements, which have been found to be very effective in removing sub-micron particles of ammonium nitrate which may be entrained in the gas stream. After passing through the filtering elements 92, the gas stream with reduced nitrogen oxides content passes out of gas-liquid contact apparatus 10 through exit 86 by means of line 88. The gas exiting apparatus 10 through line 88 can be passed directly to the atmosphere or can be used for power recovery or other convenient sources. Additionally, the exit gas in line 88 can be passed through a separator 94 and the condensed vapors returned to third stage 62 through line 96. The gas phase which exits the condenser can then be passed directly to the atmosphere or conveniently for power recovery purposes, etc.

Under certain circumstances it may be desirable to supply fresh water to the filtering elements 92, specifically Brinks HV filtering elements. To achieve this, a portion of the water introduced into third stage 62 by means of line 64 can be diverted through line 98 into filtering elements 92 by suitable valving 100. This wetting of the filtering elements 92 with water increases their efficiency in removing the sub-micron particles from the gas stream passing therethrough.

As illustrated, the pH of the recirculating water is measured by pH meter 80. In response to such pH measurement, a small amount of nitric acid can be added to third stage 62 through line 82 and valve 84 operated by pH measuring device 80.

It has been discovered in accordance with the present invention that if the pH of the water in third stage 62 is substantially below pH 6.0, there is a tendency for a release of $NO_x$ from the reaction liquid, thereby increasing the $NO_x$ content in the tail gas withdrawn from gas-liquid contact apparatus 10 through tail gas outlet 86 and line 88. On the other hand, if the pH of the water in third stage 62 is too high, i.e., about pH 7 for example, there is a tendency for ammonia to break through and be withdrawn with the tail gas.

As previously indicated, the pH within first stage 14 is generally maintained within the desired acidic range without the need for acid introduction, solely by the reaction between the $NO_x$ and reaction medium forming nitric acid and ammonium nitrate. However, where desired for particular purposes, it is advantageous in some instances to provide a separate feed of nitric acid to further control the pH of the acidic ammonium nitrate in first stage 14. This can be achieved, for example, by introducing nitric acid feed into line 16 (from a source not shown) in response to a pH measurement of the acidic ammonium nitrate in line 16 by pH meter 34. Again, however, such use of a separate nitric acid feed is generally unnecessary to achieve the advantages of the method of the present invention.

As previously indicated, the foregoing discussion has been presented in terms of steady state conditions and the pH ranges specified and flows specified are those which are achieved and occur during steady state operations involving $NO_x$ removal from a gas stream and concurrent production of ammonium nitrate product. Similarly, the components and concentrations of the various reaction media are those which occur during steady state operations and can vary considerably from the initial concentrations and components st start-up.

The start-up of the method of the present invention can be achieved by using as the initial reaction liquid either an aqueous ammonium nitrate solution or water. Taking water as an example, water feed can be introduced into third stage 62 by passing feed water through line 64 and shower heads 64. The liquid level in pool 68 will build up until the desired predetermined level is reached, whereupon water will run through downcomer 78 into second stage 36. This will result in a buildup with a liquid level in pool 42 of second stage 36 and when the liquid level in pool 42 has reached the desired level, the water will be passed to first stage 14 through downcomer 52. This will create a continuous buildup of water level in pool 22, and when the desired predetermined level is reached, recycling between the three stages will occur. When each of pools 22, 42 and 68 are at the desired level and the recycling is occurring, the pH of second stage 36 can be readjusted to its proper pH range by ammonia addition and the gas feed can be started. The reaction between the $NO_x$ of the gas feed and the water in first stage 14 will produce nitric acid and the desired ammonium nitrate will be produced through the introduction of ammonia feed through line 48. This will allow the pH in first stage 14 to fall to the desired acidic range and the ammonia feed will control the pH range of second stage 36. When these ranges are reached, steady state operations will continue and can be maintained in the manner described above.

A similar operation can be achieved using instead of an initial water feed, a feed of ammonium nitrate or, alternatively, the ammonium nitrate can be fed directly to first stage 14 and second stage 36 to initiate the start-up more quickly. It has been determined in accordance with the present invention, however, that effective start-up can be achieved with an initial water feed.

While second stage 36, the aqueous ammoniacal ammonium nitrate stage, has been described above as a single stage allowing greater contact between the gas stream and reaction liquid than the other stages, it may be more practical under certain circumstances of design to split the second stage into two or more sub-stages, each employing the same or substantially the same reaction liquid. This can be easily achieved by employing no liquid level control for the various sub-stages, thereby being a flow of reaction liquid from each sub-stage to the next succeeding sub-stage within this second stage. In this way greater contact between the gas stream and reaction liquid can be achieved without the need for a single large reaction zone.

The method of the present invention is typically applied to the removal of $NO_x$ from the tail gas of a nitric acid plant, generally operating at about 85–100 psig i.e., high pressure or 35–37 psig, i.e, low pressure. Generally, when considering a 7 atmosphere nitric acid plant, the initial flow of tail gas will be from about 0.5 to about 2.0 cu.ft/sec., the tail gas containing from about 2,500 to about 6,000 ppm $NO_x$ as NO and $NO_2$. The temperature of the incoming tail gas is typically 85° to 100° F.

It is interesting in accordance with the present invention that the ammonium nitrate product which is withdrawn through line 30 from line 16 of gas-liquid contact apparatus 10 can be utilized to affect the operation and products of the nitric acid plant absorber 20. As illustrated, in a typical nitric acid plant absorption, rich $NO_x$ is introduced into the bottom of absorber 20 through line 102 and the rich $NO_x$ is contacted countercurrently in absorber 20 on a plurality of trays with water introduced on the first or top tray through line 104. The gas stream which exits absorber 20 leaves through the top and comprises the feed through line 12 to the gas-liquid contact apparatus 10. It is an optional embodiment of the present invention that the ammonium nitrate product withdrawn through line 30 from gas-liquid contact apparatus 10 can be diverted through line 106 and passed into absorber 20 at the level of tray number 3, for example. Typically, if this option were utilized, the amount of ammonium nitrate product introduced into absorber 20 through line 106 would amount to about 30% by volume based on the water introduced through line 104. Generally, the product introduced through line 106 into absorber 20 would have an ammonium nitrate content of 20 to 40% by weight, a nitric acid content of 5 to 10% by weight with a balance being water. The operator would likely select a lower ammonium nitrate concentration if a portion of the product exiting gas-liquid contact apparatus 10 through line 30 were to be introduced into absorber 20. By operating in this optional manner, trays 1 and 2 of absorber 20 operate primarily on fresh water with the makeup aqueous ammonium nitrate product entering absorber 20 sufficiently downstream as to not affect the fresh water rinse of trays 1 and 2. This ammonium nitrate will eventually end up in the final product leaving absorber 20 through line 108. Utilization of this optional embodiment of the present invention appears to enhance the water balance associated with neutralization of nitric acid as the product of absorber 20 leaving through line 108 will generally carry about 2% ammonium nitrate, displacing 2% water from the product. A typical product of the absorber without use of this optional feed of ammonium nitrate would be approximately 57% nitric acid, 43% water. When the ammonium nitrate feed is utilized, the 43% water is reduced to 41% water with an additional 2% ammonium nitrate.

It is a further feature of the present invention, particularly for low pressure nitric acid plants or plants with low $O_2$ where abatement to a very low $NO_x$ content is required, that it may be advantageous to increase the $NO_2$ content at the exit of first stage 14 to achieve greater efficiency of $NO_x$ removal. To achieve this, an amount of the rich $NO_2$ feed from absorber 20 may be diverted through line 110 and introduced near the top of first stage 14 by means of distributor 112. This has the effect of making fresh $NO_2$ available in second stage 36 where the final portion of the $NO_x$ removal is carried out. It has been found that this has the effect of increasing the efficiency of $NO_x$ removal, particularly in low pressure systems.

The method of the present invention allows for the effective reduction of the nitrogen oxides content in a gas stream to below all environmental standards while producing an aqueous solution of ammonium nitrate product. This is achieved in accordance with the present invention by adherence to the parameters above.

The above described parameters must be taken as steady state conditions, since fluctuations of pH outside the ranges above will inevitably occur, particularly during start-up, etc. The values set forth above for the various pH ranges for the reaction liquids employed in the method and apparatus of the present invention, therefore, represent steady state conditions and, in some instances, an average pH which occurs over an extended period of time, where fluctuations occur during steady state operations.

In accordance with the method and apparatus of the present invention, it is possible to effectively reduce the nitrogen oxides content of a gas stream economically and with a minimal energy expenditure as compared with previous proposals to achieve the same result. The method of the present invention, therefore, comprises a substantial improvement over previous methods and apparatus for the reduction of nitrogen oxides content in a gas stream, particularly the tail gas from a nitric acid plant.

The present invention will now be described by reference to the following examples. It should be understood, however, that the present invention is in no way limited by these examples, and the same are presented for purposes of illustation only.

EXAMPLE 1

The method of the present invention is carried out utilizing apparatus such as illustrated. The feed to the apparatus is the tail gas from a nitric acid plant (7 atmospheres) containing approximately 6,400 parts nitrogen oxides in the form of NO and $NO_2$. The tail gas is passed through the liquid-gas contact apparatus counter-currently in contact with the following reaction liquids in the order of contact:

| Stage | Reaction Liquid | pH |
|---|---|---|
| 1 | Aqueous ammonium nitrate, specific gravity 1.162, temp. 82° F. | 0.03 |
| 2 | Aqueous ammonium nitrate, specific gravity 1.124, temp. 80° F. | 8.5 |
| 3 | Water, specific gravity 1.030–1.035, temp. 77–80° F. | 6.0–6.5 |

When operating in the foregoing manner, the final gas leaving the third stage is found to have a nitrogen oxides content of 170 ppm, far below environmental standards.

EXAMPLE 2

Utilizing the same system as employed in Example 1, the nitrogen oxides content in a tail gas from a nitric acid plant is reduced from 8,200 ppm at the inlet to the apparatus to 180 ppm at the outlet of the apparatus, utilizing a reaction sequence as follows:

| Stage | Reaction Liquid | pH |
|---|---|---|
| 1 | Aqueous ammonium nitrate, specific gravity 1.246, temp. 79° F. | 0.5 |
| 2 | Aqueous ammonium nitrate, specific gravity 1.240, temp. 78° F. | 8.5 |
| 3 | Water, specific gravity 1.026–1.110, temp. 75–78° F. | 6.2–6.5 |

Further modifications and alternative embodiments of the method and apparatus of this invention will be apparent to those skilled in the art in view of the description above. Accordingly, the preceding description is to be construed as explanatory and illustrative only and is for the purpose of teaching and enabling those skilled in the art to carry out and reproduce the invention. It is to be understood that the forms of the invention herein shown and described are to be taken as presently preferred embodiments and best mode for carrying out the method of the present invention.

What is claimed is:

1. A method for treating a gas stream containing nitrogen oxides to produce a product gas stream of reduced nitrogen oxides content which comprises counter-currently contacting the gas stream with a sequence of reaction liquids comprising:
    (a) an acidic aqueous solution of ammonium nitrate at a pH of about 0.01 to about 0.5;
    (b) thereafter an ammoniacal aqueous solution of ammonium nitrate at a pH of about 8.1 to about 8.5; and
    (c) thereafter, water.

2. The method of claim 1, wherein said gas stream containing nitrogen oxides is a tail gas resulting from the manufacture of nitric acid.

3. The method of claim 1, wherein the reaction in each of steps (a)–(c) is carried out by counter-current contact of gas and reaction liquid in a packed contact zone.

4. The method of claim 1, wherein the pH of the aqueous solution of ammonium nitrate employed in step (b) is maintained within the range of about 8.1 to about 8.5 through the addition of ammonia.

5. The method of claim 1 wherein the temperature of said acidic aqueous solution of ammonium nitrate is below about 90° F.

6. The method of claim 1 wherein lack of said acidic aqueous solution of ammonium nitrate and ammoniacal aqueous solution of ammonium nitrate has a concentration of ammonium nitrate of from about 25% to about 50% by weight.

7. The method of claim 1 wherein said acidic aqueous solution of ammonium nitrate has a free nitric acid content of from about 10% to about 15% by weight.

8. The method of claim 1 wherein the water is acidified to a pH of about 6.0 to about 6.5 through the addition of nitric acid.

9. The method of claim 1 wherein the gas stream is passed through a mist eliminator and filters after step (c) to remove sub-micron particles entrained in the gas stream.

10. A method for treating a gas stream containing nitrogen oxides to produce a final product gas stream of reduced nitrogen oxides content and an aqueous solution of ammonium nitrate as a product which comprises:
    providing a multi-stage liquid-gas contact apparatus with a plurality of contact stages arranged in series;
    passing through the first stage of said multi-stage liquid-gas contact apparatus a gas steam containing nitrogen oxides;
    simultaneously passing through said first stage of said multi-stage liquid-gas contact apparatus in counter-current contact with said gas stream a first reaction liquid comprising an acidic aqueous solution of ammonium nitrate at a pH of about 0.01 to about 0.5;

passing the gas stream exiting said first stage through a second stage and simultaneously passing through said second stage in countercurrent contact with said gas stream a second reaction liquid comprising an ammoniacal aqueous solution of ammonium nitrate at a pH of about 8.1 to about 8.5;

passing the gas stream exiting said second stage into a third stage and simultaneously passing through said third stage in countercurrent contact with said gas stream a third reaction liquid comprising water;

continuously withdrawing from said gas-liquid contact apparatus a liquid product stream comprising aqueous ammonium nitrate; and continuously withdrawing from said gas-liquid contact apparatus a gas stream leaner in nitrogen oxides.

11. The method of claim 10, wherein said gas stream containing nitrogen oxides is a tail gas resulting from the manufacture of nitric acid.

12. The method of claim 10, wherein in each of the said first through third stages the gas and reaction liquid are contacted in a packed contact zone.

13. The method of claim 10, wherein the pH of the second reaction liquid is maintained within the range of about 8.1 to about 8.5 by addition of ammonia to an aqueous ammonium nitrate solution.

14. The method of claim 10, wherein the third reaction liquid is acidified to a pH of from about 6.0 to about 6.5 through the addition of nitric acid.

* * * * *